United States Patent [19]

Cortez

[11] 4,237,653
[45] Dec. 9, 1980

[54] PLANT GROWING BOX

[76] Inventor: Reynaldo Cortez, 6015 Monterey Ave., Richmond, Calif. 94805

[21] Appl. No.: 963,403

[22] Filed: Nov. 24, 1978

Related U.S. Application Data

[63] Continuation-in-part of Ser. No. 854,690, Nov. 25, 1977, abandoned.

[51] Int. Cl.³ .............................................. A01G 9/02
[52] U.S. Cl. ......................................... 47/73; 47/77; 47/84; 217/12 R; 217/43 R
[58] Field of Search .................. 47/73, 77, 79, 82-87, 47/66, 19, 18; 217/12 R, 43 R

[56] References Cited

U.S. PATENT DOCUMENTS

| 160,088 | 2/1875 | Eby ................................. 47/73 |
| 532,687 | 1/1895 | Mulhaupt ....................... 47/73 |
| 1,028,933 | 6/1912 | Compton ..................... 217/12 R |
| 1,425,588 | 8/1922 | Hansen .......................... 47/73 |
| 1,776,375 | 9/1930 | Russell .......................... 47/73 |
| 2,319,081 | 5/1943 | Neeper .......................... 47/73 |
| 2,756,541 | 7/1956 | Berger ........................... 47/83 |
| 2,815,143 | 12/1957 | McConnell ................. 217/12 R |
| 3,198,370 | 8/1965 | Briand ....................... 217/12 R |

FOREIGN PATENT DOCUMENTS

| 220820 | 1/1909 | Fed. Rep. of Germany .............. 47/73 |
| 611675 | 11/1948 | United Kingdom ....................... 47/19 |

*Primary Examiner*—Steven A. Bratlie
*Attorney, Agent, or Firm*—Owen, Wickersham & Erickson

[57] ABSTRACT

A plant growing box with four inwardly and upwardly sloping side walls defining a quadrilateral enclosure, held together by four readily separable corner brackets having a removable securing pin. The meeting edges at the corners are spaced apart from each other to provide for ventilation there. Preferably the box walls slope inwardly at about 15° to vertical, and they are each supplied with an exterior control handle. Two lower edges provide a bottom-receiving slide for a removable perforated bottom.

5 Claims, 5 Drawing Figures

PLANT GROWING BOX

REFERENCE TO RELATED APPLICATION

This invention is a continuation-in-part of application Ser. No. 854,690, filed Nov. 25, 1977 now abandoned.

BACKGROUND OF THE INVENTION

This invention relates to an improved plant-growth box for accommodating a plurality of seedlings or plants.

Heretofore, shallow, wide, straight-sided, fixed-floored flats were the norm for germination. However, when seedlings grown in such flats have been transplanted, relatively heavy shock has often occurred, even when anti-shock materials such as vitamin B-6 and nutrient additives were used at transplant time. Moreover, these prior-art flats have often not performed well with seeds that were moderate or difficult to germinate. Some crops, such as root crops, were not satisfactorily germinated in such flats; so they were planted directly in the garden, in a permanent spot. Root crops were also started and harvested in various and sundry large pots, all of which were open-topped, with solid walls, and with one or more holes in the fixed bottom.

Many of the prior-art flats and pots were unable to achieve proper aeration. Yet aeration of the growing medium is one of the major ingredients of successful gardening, for the quality and quantity of the food and air available to the roots depends largely on aeration of the compost or composting components in the soil. For the same reason, raised beds are often helpful to the health of the soil in or out of contact with the roots.

The present invention has been developed, in part, in response to important new discoveries in the field of organic gardening. Research done at the University of California at both its Berkeley and Santa Cruz campuses, has shown that two factors are particularly important in developing healthy, nutritious and naturally disease-resistant plants. These two factors are: (1) treating the plant and the soil around it as a complete unit, that is, as a bio-dynamic mass, which should receive a minimum of disturbance throughout the plant's growth cycle; (2) employing methods of planting which maximize aeration of the soil, encourage nutrients and micro-organisms within the soil, and contribute to plant strength, and, in the case of plants having edible portions, also to the nutritive value obtainable by human beings.

SUMMARY OF THE INVENTION

Unlike previous inventions, the box of the present invention enables the bio-dynamic mass, which has established itself around the germinated seedlings, to remain intact or substantially so through the transplant cycle. This is accomplished in three important ways: (1) the box of this invention has a sliding, removable bottom; (2) the box has upwardly and inwardly sloping sides; and (3) the sides of the box are removable. To aid one in understanding the full function of these three points, they will be explained one at a time;

Point 1: The sliding removable bottom provides a system by which the gardener, once he has established the seedlings in the box, can lay the entire box and contents on top of a piece of prepared earth, slide out the bottom of the box, and enable the entire bio-dynamic mass, established within the box, to join with the earth in a relatively undisturbed manner.

Point 2: The sloping sides of the box enable the whole bio-dynamic mass to slip easily from the box when the bottom is removed. In addition, but of equal importance, the sloping sides establish a "terracing" shape to the transplanted bio-dynamic mass. The entire mass can then rest on top of the earth, allowing ideal aeration for the newly established plant-soil whole.

Point 3: The removable sides of the box make it possible to remove a small fraction of the bio-dynamic mass from the box without disturbing the rest of the mass. This is especially important if a gardener wishes to start more than one kind of plant within the same box at once. It is also significant when the gardener wants a different ultimate spacing. With this flexibility, species with different transplanting schedules can be started at the same time.

The removable sides have an additional advantage to the gardener or nurseryman who wishes to use a large number of these boxes, in that the empty boxes are thereby collapsible and can be stored compactly.

In summary, the box of this invention answers the needs of the nurseryman or gardener who is aware of the most recent, well-tested, and highly successful techniques of modern, organic gardening. It provides for a way of germinating and transplanting that maintains the integrity of the bio-dynamic mass and establishes ideal aeration of this mass both during the germination period and after.

Only recently, with the establishment of the importance of aeration and the maintenance of the bio-dynamic mass, has the need arisen for germination boxes of this kind. And it is to these needs, as well as some others, that the present invention is addressed.

The box of this invention is a basic tool by which an average homeowner, with only a small amount of gardening knowledge, can make use of the most successful gardening techniques known. He can obtain high-yield, healthy, disease-resistant plants which provide optimal nutritive value for human consumption.

The box may also be used as a mobile cold frame, with or without a top and with or without its bottom.

Structurally speaking, a plant-growing box of this invention has a removable bottom and four inwardly and upwardly sloping side walls defining a quadrilateral enclosure, the angle of slope being preferably about 15° from vertical. Moreover, such of those side walls is readily removable. Further, the side walls are spaced apart at the corners, to provide for ventilation there.

BRIEF DESCRIPTION OF THE DRAWINGS

In the drawings:

FIG. 4 is an enlarged fragmentary top plan view of one corner of the box.

DETAILED DESCRIPTION OF A PREFERRED EMBODIMENT

Figure 1:
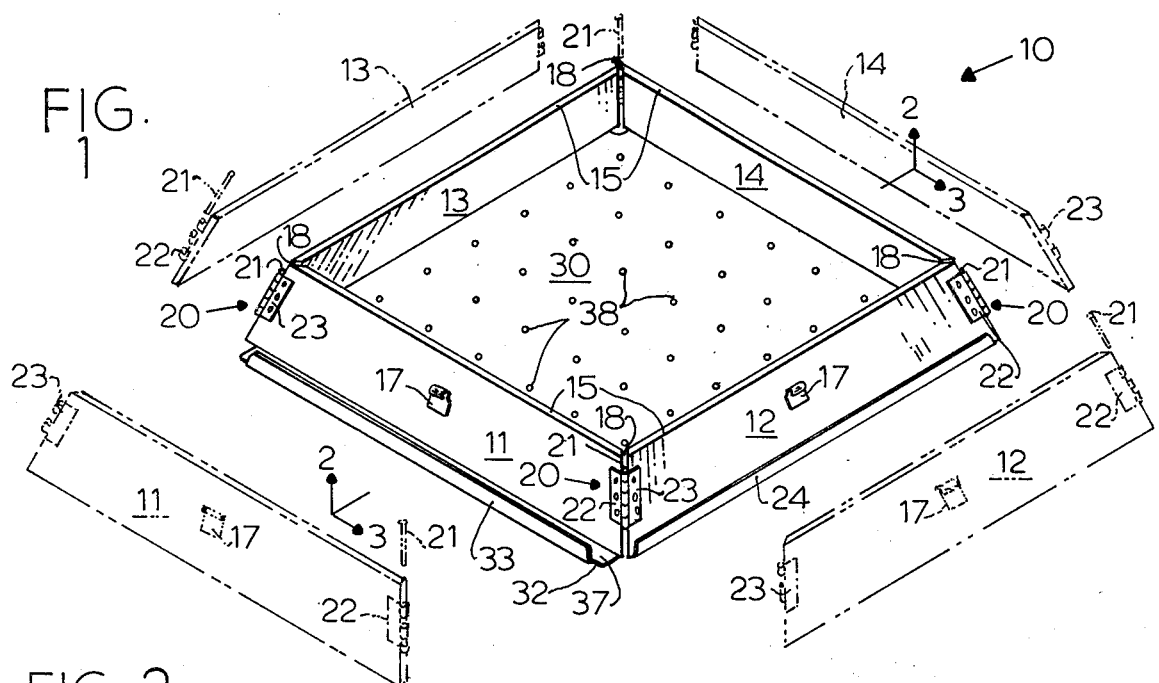
FIG. 1 is an isometric view of a plant-growing box embodying the principles of the invention. For illustrative purposes the removable sides are shown in broken lines in an exploded position.
Figure 2:
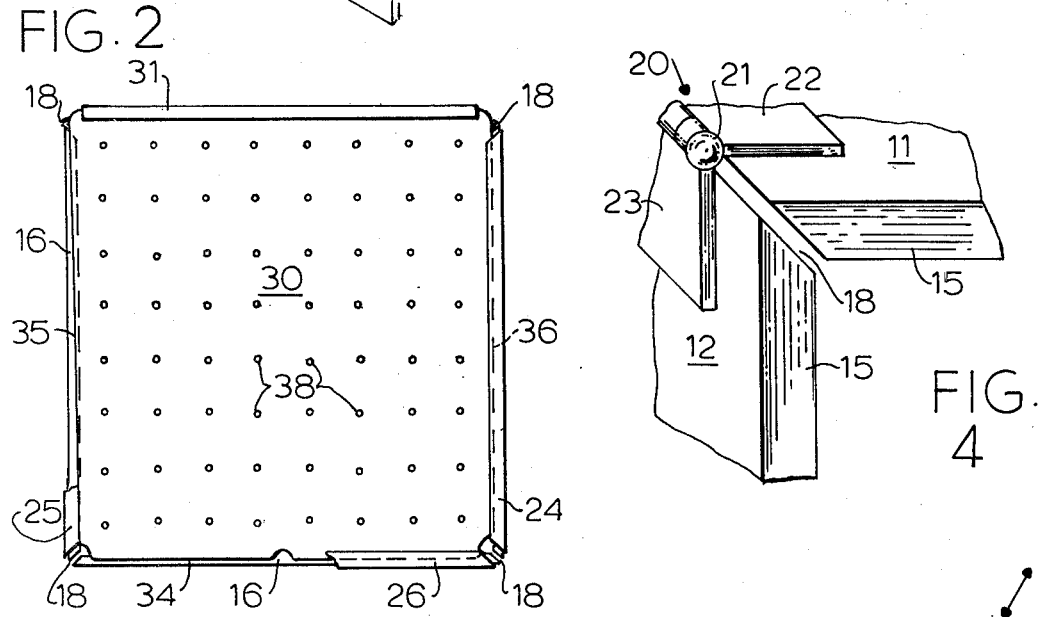
FIG. 2 is a bottom view taken along the line 2—2 in FIG. 1.
Figure 5:
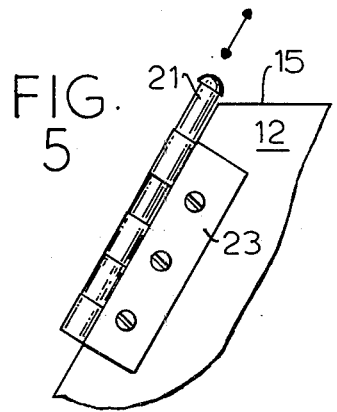
FIG. 5 is an enlarged fragmentary side view of the same corner.
Figure 3:
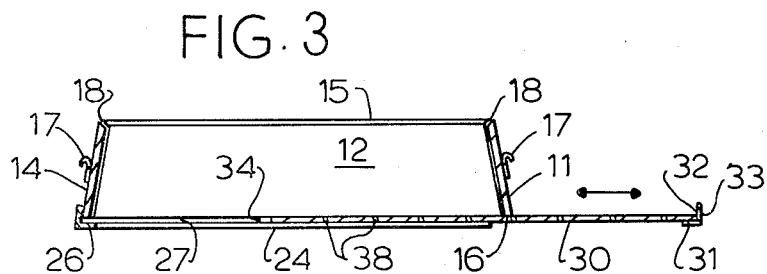
FIG. 3 is a view in vertical section taken along the line 3—3 in FIG. 1 and with the bottom partly withdrawn.

A plant-growing box 10 of this invention has four upwardly and inwardly slanting walls 11, 12, 13, and 14. The slant is preferably about 15° from vertical. This angle facilitates removal of the box 10 from the biodynamic mass, the contained soil and plants, and the mass is relatively undisturbed by the removal of the box. The box 10 is considerably higher than ordinary nursery flats, preferably being about 5½" high.

The four walls 11, 12, 13, and 14 are preferably identical, preferably a 1"×6" (actually ¾"×5½") pine or redwood board. Preferably, the top surfaces 15 of all the boards 11, 12, 13, and 14 slant inwardly on a separate plane for each wall so that the edges 15 are easy to clean. The lower surfaces 16 of the boards 11, 12, 13, and 14 are horizontal. Midway along each wall 11, 12, 13, 14, there is preferably a finger-hold bracket or handle 17, which helps in moving the box 10, especially after it has been planted.

At the corners, the walls 11, 12, 13, and 14 are spaced apart from each other (see FIG. 4), providing air passages 18 at the corner intersections. Bridging these gaps 18 are separable brackets 20; these brackets 20 may be hinges with readily removable hinge pins 21. Each bracket 20 has two leaves 22 and 23, each secured to a different wall. Any wall 11, 12, 13, or 14 can be removed from the box 10 by lifting out its two hinge pins 21, and all four walls 11, 12, 13, and 14 can be removed by taking out all four hinge pins 21. In place of hinges 20 a less-expensive type of bracket 20 held together by such a pin may be used, for the hinging action itself is not made use of.

The lower surfaces 16 of the boards 11, 12, 13, and 14 are, as said before, horizontal or plumb cut, i.e., flat cut, for easy application of floor bracket members 24 and 25, to two walls 12 and 13, and preferably for application of a third floor bracket member 26 to the wall 14. The members 24 and 25 provide channels 27 in which a removable bottom member 30 can slide in or out, and the third bracket member 26 provides a stop for retaining the member 30 in a fully installed position. The bottom member 30 is preferably a sheet of oil-tempered, double-hard face, hardboard, such as Masonite, having an aluminum edging member 31 (just like the members 24, 25, and 26) as a handle, preferably riveted to one edge 32 and having a flange 33. The bottom 30 may be inserted either with the flange 33 up or down, usually up. The bottom 30 is enough longer than the walls 12 and 13 so that when the distal edge 34 of the bottom member 30 is fully nested in the stop bracket 26, there will be finger space 37 between the wall 11 and the handle bracket 31. The hardboard resists warping, swelling, and rotting. The side edges 35 and 36 of the bottom 30 are slightly tapered, being widest near the handle 31 and narrowest at the distal edge 34. This helps insertion and removal of the bottom 30. The bottom 30 is preferably perforate, with a large number of ventilating openings 38, but most of the area of the bottom 30 is solid, to support the soil, and the openings 38 are each small, so that the soil does not drop out freely when the box 10 is moved from one location to another.

The use of the box 10 starts with the gardener germinating seeds in it. In cold weather, for example, the portability of the box 10 allows the gardener to bring the soil-filled box and his seeds into the house where a controlled atmosphere is available. This means that a person who owns such a box 10 can have all the advantages of an atmosphere-controlled greenhouse—but at a mere fraction of the cost. In the atmosphere which the house provides, the germinating seeds can be nurtured until the seedlings and strong enough to be taken outside. Meanwhile, the earth upon which the seedlings are to be transplanted, can be yielding other crops that were begun earlier. Or, the earth itself can be in the process of being prepared, through compost or whatever, to receive the germinating seeds when they're ready.

The box 10 allows the home gardener to make intensive use of a small amount of land. Plants may be started in the box 10 and then their growth continued, after being transplanted, on small, numerous, well-aerated plots, which may be created by the box itself. One box 10 can be used over and over again throughout the year, or two or more can be employed if the gardener wishes to germinate more than one species at a time. Thus, far more horizontal space can be immediately cultivated intensively, and this can be done with far less effort per square foot.

For planting, the floor 30 is slid in. Preferably, a layer of one-quarter to one-half inch of medium grade sand and small pebbles is spread on top of the floor 30. Above that is, preferably, a layer of about 4"–4½", a combination of soil, sand, and compost. Above that, preferably, may be placed a top layer, about 1"–1½" of sandy fine compost. Selected seeds or cuttings are placed on the top layer, moistened, and then covered with fine sand and compost. The mobile box 10 can be placed right where the coming growth is to be transplanted or it can be placed indoors, in a house, a greenhouse, or in a potting shed, or in a potting area outdoors. If used outdoors, a sheet of glass or plastic can be placed over the top for added warmth.

At an appropriate transplanting time, the box 10 is carried to a cultivated receiving spot. Preferably, it is positioned either flat or with a slight tilt toward the sun; if desired, the sides may be aligned with either the magnetic or true north-south axis. The receptor spot surface can be tilted (15°) to face the midday sun; the contents of box 10 can then be deposited on the angled receptor spot to effectively receive and use more of the volume of unlimited sunshine rather than reflecting it away. The nutrients will thus have a more effective leaching flow-away path, for the lower plant's roots will be in receipt of some of the upper plant's leached-away nutrients.

In case of "poor" ground (rocks, weeds, unwillingness to dig, presently growing something else) just light hoeing, watering and compost at the receptor spot are in order. Then the contents of the box 10 may be deposited atop of it all.

When the seedlings are strong, typically about 1½" high or so, the floor 30 can be pulled out, leaving everything in position. The surface inside the box 10 then drops about ¼" and the lower portion starts to combine at the interface with the earth. Watering at this time can get heavier. Weeding or thinning or additional compost inside the box is also then appropriate. When the biodynamic mass drops, if falls down and away from the sides 11, 12, 13, and 14 of the box 10.

After two or three weeks the box 10 itself can also be removed vertically, at which time coarse compost can be coved against the exposed shoulders of the resulting new raised garden bed. The floor 30 can then be slid back into the box 10, and the process repeated.

The box 10 enables removal of either the entire contents or a fraction thereof for transplant with a minimum disturbance to the plants. The removable sides allow a few or even a single plant to be removed. If transplanting is timely, the entire bio-dynamic mass for that single plant remains intact. The sliding bottom 30 allows removal of a row or two of plants without disturbing the bio-dynamic mass.

Alternatively, any or all of the side walls 11, 12, 13, and 14 may be removed, whether to transplant a single plant or to transplant all the plants in the box 10. All that need be done, is to locate the box 10 where it is desired to place the plant, slide the bottom 30 out partway and then remove, for example, the wall 14, to remove a single plant or a row of plants.

The box 10 of this invention meets the new needs of gardening techniques discovered through the "French Intensive-Double Dig" research, for aeration increases compost activity (while in the box). Also, the box 10 enables establishing a bio-dynamic mass raised above surrounding soil level, which thereby continues aeration after transplanting.

The box 10 provides for use of a method for germinating plants which are particularly susceptible to transplanting shock, for the soil established around a new plant is virtually undisturbed at the time of transplanting. Furthermore, the soil around a new plant can rest on top of earth, allowing for a gradual, natural marriage of the bio-dynamic mass contained in the box with the earth.

The germination box 10 can be operated as a pyramid base mold without the bottom 30, if warm whether is available for germination and if a large intensive garden is intended. The garden may be laid out using two-foot modulus with a very narrow walkway between the pyramid-base raised beds. There is very high yield potential with the extra output from not having to have wide walkways. A 20'×20' space can provide a very productive garden.

The box 10 is, of course, useful in vegetative propagation as well as in growing from seeds. It adapts well to many types of cloning procedures, including layering, root-division, cuttings, and cross-division techniques.

The box 10 has the advantage of providing a stronger structure than normal flats. It mobility, its molding form, its easy removability and its subsequent reuse and utility are further advantages. The need for digging at the earth's surface decreases enormously. Light hoeing is in order.

The proper use of the box 10 means that plants at transplanting time don't suffer shock; therefore there is no need for using transplant-shock materials. Also, at transplant time, the plants in effect get a hoeing from underneath, for removal of the floor 30 acts as a wide gentle hoeing of the roots below their meristem areas.

While gardening texts indicate that one should not transplant such things as carrots, beets, radishes, orchids, peppers, melons, cucumbers, asparagus, or potatoes, all of these are relatively easy to transplant successfully from a box 10 of this invention because of its removable sides 11, 12, 13, and 14 and its removable bottom 30.

There is a significantly helpful flow of air through the sides of the newly formed raised bed upon removal of the wooden sides 11, 12, 13, and 14. The box 10 enables easily achievable vertically abstract laminate high yields from a primary growing space. There is a greatly accelerated cultivation rate of the growing space and greatly increased health especially for annuals. The health of the soil is greatly increased.

Use of the box 10 also enables staggered harvesting; timely and more complete use of harvest and can result in year-round gardening, with year-round harvests. The box 10 can be used to provide very beautiful quilting of garden growth patches. It greatly reduces the amount of water required, because of the high percentage of compost and the deep root growth. It greatly reduces the chance of bug infestation. It helps in obtaining consistent use of compost from backyard or neighborhood composter.

The plants to be transplanted can be stronger, with a better protein-to-carbohydrate ratio, at transplant time because of greater depth of the container 10 than is found in the usual flat (i.e., more powerful roots).

Such plants as high yield beans (Kentucky wonder) can be started anywhere that temperature of 65° or higher can be maintained and some light in the late winter for powerful germination; then they can be moved to the garden for dispersion of seedlings before the flower stage. By the middle of April (in appropriate areas) when the natural red light spectrum has enlarged, the harvest of beans may begin. Moreover, the total harvest may be increased by 2 to 3 times.

"Double digging" the receptor spot for the contents of the box 10, helps the roots of transplants in terms of fresh volume of air and nutrients and lack of resistance to growing roots. As noted before, the box 10 is easily taken apart, without tools, and the walls 11, 12, 13, 14 (which are preferably identical) may then be compactly stored, as may the bottom member 30. This structure also enables compactness for shipping the box 10, and it is readily assembled.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A plant-growing box, including in combination:

four inwardly and upwardly sloping side walls, the length of each of which is several times as large as its height, defining a quadrilateral enclosure with four corners, each said side wall being beveled at each corner edge at 45°, the slope inwardly being about 15° to vertical, two facing said walls having their lower edges providing a bottom-receiving slide, bracket means on the outwardly facing surface of said box at each corner having two leaves, each joined to a different one of the two walls meeting at that corner, said bracket means being freely separable into two portions, each comprising one leaf, readily removable securing means for holding the two portions of said bracket means together, said bracket means and securing means holding the two beveled edges at each corner of the walls spaced apart from each other a uniform distance from bottom to top, in order to provide for ventilation there, and a removable bottom wall slidable in said slide, the bottom wall having a large number of ventilating and draining perforations and otherwise imperforate, said bottom wall being of hardboard with a metal angle member at one end to serve as a handle and with two nearly parallel side edges that taper convergingly from said handle toward the opposite end.

2. The box of claim 1 wherein each wall has a centrally located lifting handle.

3. The box of claim 1 wherein the upper edge of said box slopes inwardly and downwardly at about 15° to the horizontal.

4. A plant-growing box, including in combination:

four inwardly and upwardly sloping side walls of identical length, several times as long as their height, defining a quadrilateral enclosure with four corners, each side wall at each corner being beveled at 45°, the box walls sloping inwardly at about 15° to vertical and the upper edge of said side wall sloping inwardly and downwardly at about 15° to the horizontal, three of said walls having a lower edge providing a bottom-receiving slide and a bottom-receiving stop receptacle, bracket means at each corner having two leaves, each leaf being joined to an outside surface of a different one of the two walls meeting at that corner, said bracket means being freely separable into two portions, each comprising one leaf, a readily removable bracket-securing pin for holding the two portions of said bracket means together, said bracket means and pin holding the two beveled edges of the meeting edges of the walls at each corner spaced apart from each other by a predetermined uniform amount from top to bottom, in order to provide for ventilation there, and a removable bottom wall slidable in said slide, said bottom wall comprising a hardboard member having a large number of ventilating and draining perforations but otherwise imperforate and having a metal angle member at one end to serve as a handle, said hardboard member being longer than said walls to space the handle away from said box, and side edges of said hardboard member tapering convergingly from said handle toward the opposite end.

5. The box of claim 4 wherein each wall has a centrally located lifting handle.

* * * * *